3,235,462
BARIUM SULFATE AND COMPRESSED GAS
RADIOPAQUE AGENT
Cecil Wolfson, Jacksonville, Fla., assignor to Eastern Baker Pharmaceutical Corporation, a corporation of Florida
No Drawing. Filed Apr. 30, 1963, Ser. No. 276,978
4 Claims. (Cl. 167—95)

This invention relates to barium sulfate preparations and more particularly to such preparations in combination with a compressed gas which is adapted to expel and aerate the preparations.

Barium sulfate has long been used as a contrast medium in roentgenography of the gastrointestinal tract and also as an anti-diarrheal. It is useful for these purposes because it is completely innocuous, even when taken in large doses. Because of the extreme insolubility of barium sulfate, it is non-poisonous. In fact, the usual antidote for poisonous barium compounds is to convert them to barium sulfate by drinking sodium sulfate solution.

Barium sulfate is administered as a suspension and can be given orally or rectally. The oral route is preferred and the rectal route is generally reserved for examination of the colon. Quantities from 30 grams (1 ounce to about 360 grams (12 ounces) may be used depending upon the extent of the examination. For most procedures ⅔ ounce of barium sulfate are employed.

The barium sulfate is mixed with sufficient water to produce a suitable suspension. However, at times it is mixed with an oatmeal-like cereal ingested as such. The usual procedure is as a liquid suspension. A uniform suspension of barium sulfate free from lumps is desired. This is generally difficult to accomplish and care must be taken to insure freedom from lumps of barium sulfate. The lumps can falsely indicate the presence of an ulcer. To overcome this danger the suspension is passed through gauze to reduce the size of any lumps which may be present. This is a time consuming process, it is messy, and the final product leaves much to be desired.

Another source of difficulty is found in the fact that the insoluble particles of barium sulfate will settle rapidly. This rate of settling is controlled to a certain degree by the dispersion of the barium sulfate, but there is a limit to the degree of dispersion which can be obtained by hand agitation.

The final problem encountered with barium sulfate is its chalky and bland taste. Many attempts have been made to enhance the taste by flavoring the product. This is generally done by a hospital pharmacist or by the laboratory technician just prior to administration of the barium sulfate. These products have not been generally accepted due to the difficulty in preparing them.

The barium sulfate preparation of this invention not only avoids the disadvantages described above, but also brings about certain advantageous features not found in existing preparations. The barium sulfate preparation of this invention provides a flavored, ready-to-mix barium sulfate which is prepared instantly. The final preparation consists of finely dispersed barium sulfate throughout the liquid medium which is used. There are no lumps present, and the rate of settling is substantially reduced due to this exceedingly fine dispersion. The finer particle size and increased dispersion of the barium sulfate throughout the liquid medium renders the product significantly more effective as a contrast media. It has been established that the particle size of the barium sulfate is an important factor and that very minute particles improve suspension stability and facilitate coating of the mucosa. This is a feature not found in any other barium sulfate preparation.

Once the product is dispensed into a glass, the barium sulfate remains suspended for a longer period of time compared to other known methods of preparation. Since a soluble, compressed gas, such as nitrous oxide or carbon dioxide, is advantageously used as a propellant, this gas tends to not only completely disperse the barium sulfate, but also, when the barium sulfate is administered, it tends to bring the barium sulfate into intimate contact with the gastrointestinal walls. This is due to the expansion of the gas dissolved in the product. Moreover, the flavored, carbonated, or aerated barium sulfate is usually palatable and far easier to administer than previously existing products.

The barium sulfate solutions of this invention can be prepared by thoroughly mixing together barium sulfate in a suitable liquid medium. Advantageously a flavoring is added. The resulting suspension of barium sulfate is then introduced into the familiar aerosol type container wherein the suspension is maintained in contact with a suitable compressed gas. The pressure of the gas, when the discharge valve is released, forces the barium sulfate suspension out through the discharge tube and nozzle, thereby providing an instantly prepared barium sulfate preparation. This unusually palatable prepartion consists of extremely divided barium sulfate particles which, because of the compressed gas, tends to bring the barium sulfate, when administered, into intimate contact with the gastrointestinal tract. The barium sulfate particles which are suspended in the liquid medium tend to remain suspended for appreciable periods of time.

The barium sulfate which is used according to this invention is the standard barium sulfate ordinarily used for roentgenographic purposes and should be free from any toxic soluble barium salts. Any suitable liquid medium can be used such as tap water, distilled water, milk, etc., and any suitable flavoring can be used, if desired.

Although it is preferred to use a soluble gas, such as carbon dioxide or nitrous oxide, in the aerosol container in which the barium sulfate suspension is maintained under pressure, insoluble gases, such as nitrogen may also be used. Mixtures of various gases can be used.

The amount of barium sulfate, flavoring, gas, etc. which can be used will vary widely depending upon the taste, concentrations, etc., desired. One skilled in the art can readily determine the most suitable amounts of each ingredient to use. For example, the barium sulfate can be used in any amount, so long as it is not so much as to impede its release from the valve of the aerosol container when the valve is opened.

The following formula may advantageously be used:

| | parts |
|---|---|
| Barium sulfate | 6–10 |
| Cherry flavored syrup | 6 |
| Distilled water | 12 |

This formulation is placed in an aerosol container having a suitable valve, i.e., aerater container valve, and carbon dioxide, as a propellant, is introduced into the container. The container is preferably shaken and inverted over a drinking glass and dispensed through the valve. There is very little tendency for the dispensed barium sulfate particles to precipitate, and these particles are in an extremely fine dispersion. Upon administration of this flavorful barium sulfate preparation, it is noticed that the barium sulfate tends to come into intimate contact with the gastrointestinal walls and provides an excellent contrast media for roentgenography.

Generally, the amount of barium sulfate used should not be greater than about 60 parts by weight of barium sulfate suspended in about 75 parts by weight of water, since higher concentrations of barium sulfate are not readily released through the valve of the aerosol container. If an insoluble gas, such as nitrogen, is used, it is noted that the dispensed barium sulfate remains in suspension for appreciable periods of time.

Various sized containers, generally from 2 to 45 fluid ounces (and preferably from 4 to 6 fluid ounces) in capacity can be used.

I claim:

1. A barium sulfate preparation which comprises a dispersion of barium sulfate in a liquid medium in combination with compressed gas adapted to expel and aerate the dispersion.

2. A barium sulfate preparation which comprises a dispersion of barium sulfate and a flavoring in a liquid medium in combination with compressed gas adapted to expel and aerate the dispersion.

3. The barium sulfate preparation of claim 2 in which about 60 parts by weight of barium sulfate are present and at least about 75 parts by weight of liquid medium are present.

4. The barium sulfate preparation of claim 2 in which the liquid medium is water.

References Cited by the Examiner

UNITED STATES PATENTS 2,294,172   8/1942   Getz _____ 167—82

OTHER REFERENCES

Adolph et al., Radiology, vol. 54, pp. 878–883, 1950.
J.A.M.A., vol. 153, No. 16, pp. 1417–1421, Dec. 19, 1953.
Modern Drugs, Sept. 1956, p. 896, Bardef entry.
Sciarro, J. of the American Pharmaceutical Association, Nov. 1958, pp. 672–674.

JULIAN S. LEVITT, *Primary Examiner.*

FRANK CACCIAPAGLIA, Jr., *Examiner.*